United States Patent
Singh et al.

(10) Patent No.: US 12,332,748 B1
(45) Date of Patent: Jun. 17, 2025

(54) CXL MEMORY SUBSYSTEM UNAVAILABILITY RECOVERY SYSTEM

(71) Applicant: Dell Products L.P., Round Rock, TX (US)

(72) Inventors: Navdeeppal Singh, Bengaluru (IN); Guru Prasad Yadav, Bangalore (IN); Swapan Kumar Bhakat, Jaduguda (IN); Saladhi Parameswara Rao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/540,103

(22) Filed: Dec. 14, 2023

(51) Int. Cl.
*G06F 11/14* (2006.01)

(52) U.S. Cl.
CPC ...... *G06F 11/1456* (2013.01); *G06F 2201/85* (2013.01)

(58) Field of Classification Search
CPC ..... G06F 1/14; G06F 11/1456; G06F 2201/85
See application file for complete search history.

(56) References Cited

U.S. PATENT DOCUMENTS

| | | | |
|---|---|---|---|
| 9,342,423 B2* | 5/2016 | Judd | G06F 11/2284 |
| 10,198,327 B1* | 2/2019 | Gopinath | G06F 11/1469 |
| 11,010,250 B2* | 5/2021 | Berke | G06F 11/1428 |
| 11,068,365 B2* | 7/2021 | Springberg | G06F 11/2094 |
| 11,093,332 B2* | 8/2021 | Dawkins | G06F 11/1438 |
| 11,803,444 B1* | 10/2023 | Steinmetz | G06F 11/1415 |
| 2019/0188082 A1* | 6/2019 | Lee | G06F 11/1441 |
| 2021/0026732 A1* | 1/2021 | Park | G11C 29/4401 |
| 2021/0149812 A1* | 5/2021 | Sen | G06F 13/4022 |
| 2021/0158874 A1* | 5/2021 | Jang | G06F 3/0619 |
| 2021/0255800 A1* | 8/2021 | Horev | G06F 3/064 |
| 2021/0263656 A1* | 8/2021 | Lu | G06F 3/065 |
| 2023/0376216 A1* | 11/2023 | Lee | G06F 3/0656 |
| 2023/0376217 A1* | 11/2023 | Lee | G06F 3/0673 |
| 2023/0376238 A1* | 11/2023 | Lee | G06F 3/0659 |

\* cited by examiner

*Primary Examiner* — Kamini B Patel
(74) *Attorney, Agent, or Firm* — Joseph Mencher

(57) ABSTRACT

A CXL memory subsystem unavailability recovery system includes a computing device having a CXL device, CXL memory subsystems, a non-volatile memory system, and a CXL memory subsystem unavailability recovery subsystem. The CXL memory subsystem unavailability recovery subsystem configures the first CXL device to use a first CXL memory subsystem, and copies data stored in the first CXL memory subsystem by the first CXL device to the non-volatile memory system to generate back-up data. During runtime operations for the computing device, the CXL memory subsystem unavailability recovery system determines the first CXL memory subsystem is unavailable, copies the back-up data from the non-volatile memory system to a second CXL memory subsystem, and configures the first CXL device to use the second CXL memory subsystem and stop using the first CXL memory subsystem without requiring initialization of the computing device subsequent to the determination that the first CXL memory subsystem was unavailable.

20 Claims, 12 Drawing Sheets

CXL MEMORY SUBSYSTEM UNAVAILABILITY RECOVERY SYSTEM

BACKGROUND

The present disclosure relates generally to information handling systems, and more particularly to recovering from the unavailability of a CXL memory subsystem used in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and other computing devices known in the art, sometimes utilize a Compute eXpress Link (CXL) memory system. As will be appreciated by one of skill in the art in possession of the present disclosure, CXL is a high-speed interconnect technology that allows heterogeneous CXL devices in the computing device to dynamically pool distributed CXL memory subsystems that provide the CXL memory system in order to expand memory available to any of those CXL devices, address dynamic requirements of workload provided by the computing device, and/or provide other benefits that would be apparent to one of skill in the art in possession of the present disclosure. However, in the event a CXL memory subsystem in the CXL memory system becomes unavailable during runtime of the computing device, the CXL device and/or computing device may "crash" or otherwise become unavailable, and that computing device must be reset, rebooted, and/or otherwise initialized in order to reconfigure the CXL memory system for use by the computing device, which results in undesirable downtown of the computing device.

Accordingly, it would be desirable to provide a CXL memory subsystem unavailability recovery system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Compute Express Link (CXL) memory subsystem unavailability recovery engine that is configured to: configure a first CXL device that is coupled to the processing system to use a first CXL memory subsystem that is included in a CXL memory system that is coupled to the processing system; copy data stored in the first CXL memory subsystem by the first CXL device to a non-volatile memory system that is coupled to the processing system to generate back-up data; determine, during runtime operations for the IHS, that the first CXL memory subsystem is unavailable; copy, during the runtime operations for the IHS, the back-up data from the non-volatile memory system to a second CXL memory subsystem that is included in the CXL memory system; configure, during the runtime operations for the IHS, the first CXL device to use the second CXL memory subsystem and stop using the first CXL memory subsystem without requiring initialization of the IHS subsequent to the determination that the first CXL memory subsystem was unavailable.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
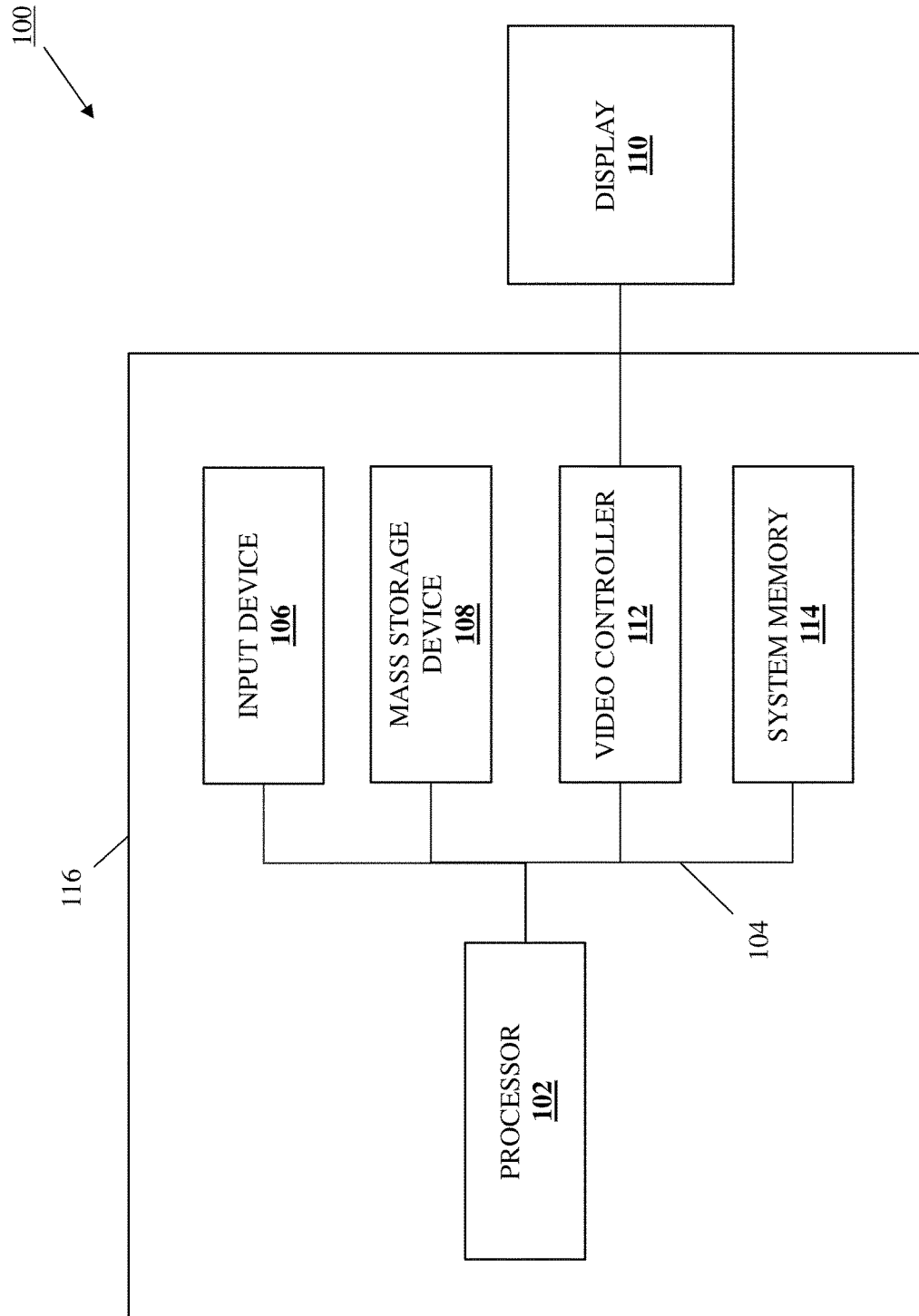
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
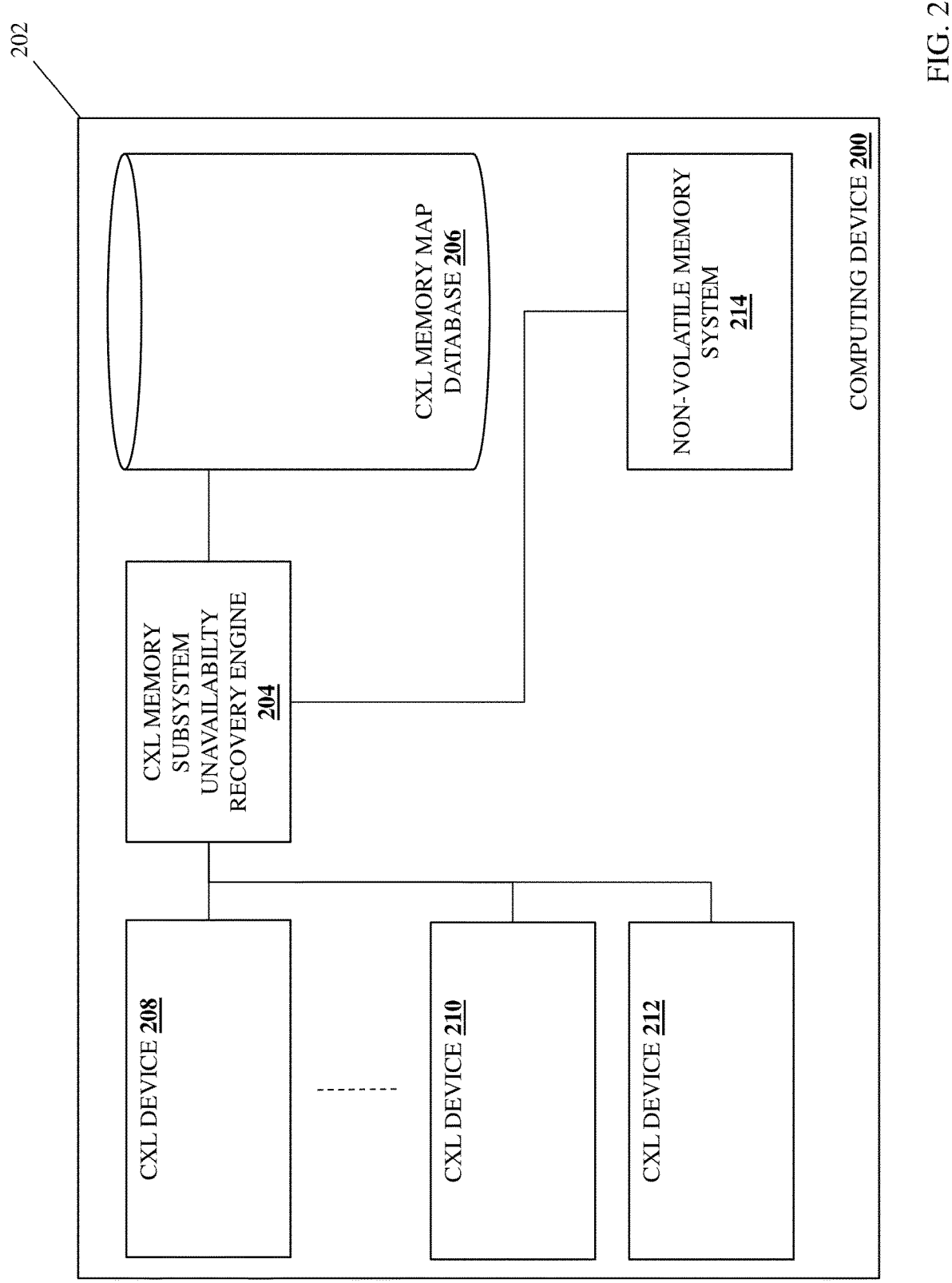
FIG. 2 is a schematic view illustrating an embodiment of a computing device that may provide the CXL memory subsystem unavailability recovery system of the present disclosure.

Referring now to FIG. 2, an embodiment of a computing device 200 is illustrated that may provide the CXL memory subsystem unavailability recovery system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other computing devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a CXL memory subsystem unavailability recovery engine 204 that is configured to perform the functionality of the CXL memory subsystem unavailability recovery engines, CXL memory subsystem unavailability recovery subsystems, and/or computing devices discussed below.

To provide a specific example, the CXL memory subsystem unavailability recovery engine 204 may be provided by a Central Processing Unit (CPU) that is included in the processing system described above (e.g., via a root complex in the CPU), a Baseboard Management Controller (BMC) device (e.g., the integrated DELL® Remote Access Controller (iDRAC) provided in server devices available from DELL® Inc. of Round Rock, Texas, United States), a CXL switch device, and/or using any other hardware and/or software that one of skill in the art in possession of the present disclosure would recognize as being capable of providing the CXL memory subsystem unavailability recovery functionality described below. Furthermore, specific examples discussed below describe the CXL memory subsystem unavailability recovery engine 204 providing an operating system (e.g., via the CPU discussed above) and a fabric manager (e.g., application-specific logic provided via the root complex in the CPU, the BMC device, or the CXL switch device discussed above to compose and manage the CXL memory system as described below) that operate to enable the CXL memory subsystem unavailability recovery functionality described below. However, while specific software subsystems are described as performing specific functionality below, one of skill in the art in possession of the present disclosure will appreciate how the CXL memory subsystem unavailability recovery functionality described below may be enabled in a variety of manners that will fall within the scope of the present disclosure as well.

The chassis 202 may also house a storage system (not illustrated, but which may be provided by a Random Access Memory (RAM)) that is coupled to the CXL memory subsystem unavailability recovery engine 204 (e.g., via a coupling between the storage system and the processing system) and that includes a CXL memory map database 206 that is configured to store the CXL device/memory subsystem mappings for a CXL memory pool provided by the CXL memory system described below, as well as any other information utilized by the CXL memory subsystem unavailability recovery engine 204 discussed below.

As illustrated, the chassis 202 may also house a plurality of CXL devices 208 and up to 210 and 212 that are each coupled to the CXL memory subsystem unavailability recovery engine 204 (e.g., via a coupling between that CXL device and the processing system), and one of skill in the art in possession of the present disclosure will appreciate how each of the CXL devices 208-212 may be configured according to the CXL standard to utilize the CXL memory system described in further detail below. For example, any of the CXL devices 208-212 may be provided by hardware accelerator devices and/or other Type 1 CXL devices that would be apparent to one of skill in the art in possession of the present disclosure; Graphics Processing Unit (GPU) devices, Application Specific Integrated Circuit (ASIC) devices, Field Programmable Gate Array (FPGA) devices, and/or other Type 2 CXL devices that would be apparent to one of skill in the art in possession of the present disclosure; memory expander devices and/or other Type 3 CXL devices that would be apparent to one of skill in the art in possession of the present disclosure, as well as any other CXL devices known in the art. Furthermore, while the CXL devices 208-212 are illustrated and described as being housed in the chassis 202, one of skill in the art in possession of the present disclosure will appreciate how the CXL devices 208-212 may be provided external to the chassis 202 via a CXL fabric device (e.g., in a Just a Bunch of Memory (JBOM) system, a CXL memory appliance, etc.) while remaining within the scope of the present disclosure as well.

The chassis 202 may also house a non-volatile memory system 214 that is coupled to the CXL memory subsystem unavailability recovery engine 204 (e.g., via a coupling between the non-volatile memory system 214 and the processing system) and that may be included in a Solid State Drive (SSD) storage device (e.g., a CXL-compliant SSD storage device) and/or other devices that one of skill in the art in possession of the present disclosure will recognize as including non-volatile memory systems. However, while described as being provided in a CXL-compliant device, one of skill in the art in possession of the present disclosure will appreciate how the non-volatile memory system 214 need not be provided by a CXL device that is configured according to the CXL specification in order to enable the functionality of the present disclosure. Furthermore, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the CXL memory subsystem unavailability recovery functionality discussed below, while remaining within the scope of the present disclosure as well.

Figure 3:
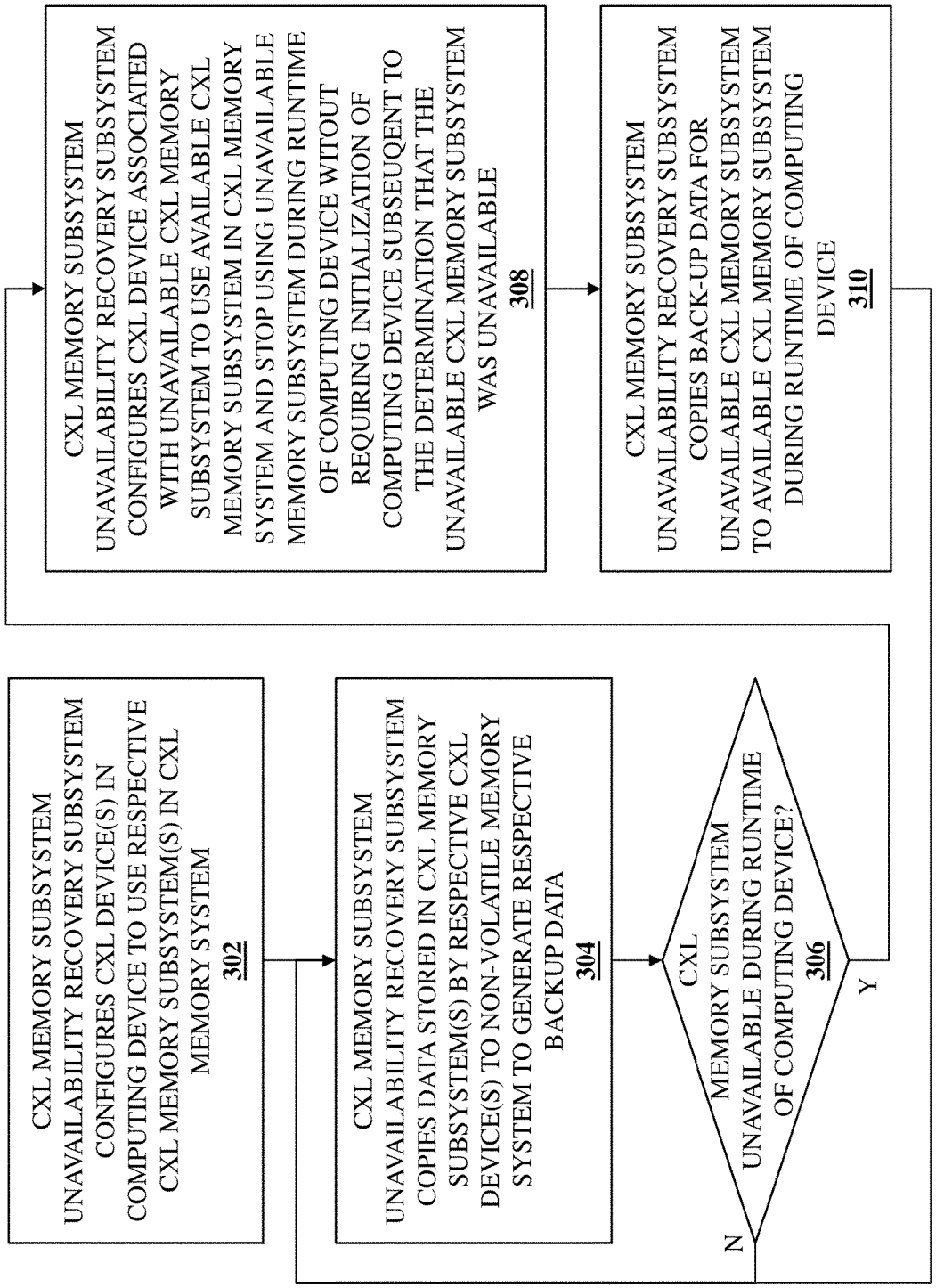
FIG. 3 is a flow chart illustrating an embodiment of a method for recovering from unavailability of a CXL memory subsystem.

Referring now to FIG. 3, an embodiment of a method 300 for recovering from unavailability of a Compute Express Link (CXL) memory subsystem is illustrated. As discussed below, the systems and methods of the present disclosure provide for the backing up of data stored in CXL memory subsystem(s) by respective CXL device(s) to a non-volatile memory system, and when any of those CXL memory subsystem(s) become unavailable, the copying of the back-up data for that unavailable CXL memory subsystem from the non-volatile storage system to an available CXL memory subsystem, and the configuration of the respective CXL device associated with the unavailable CXL memory subsystem to use the available CXL memory subsystem in place of that unavailable CXL memory subsystem.

For example, the CXL memory subsystem unavailability recovery system may include a computing device having a CXL device, CXL memory subsystems, a non-volatile memory system, and a CXL memory subsystem unavailability recovery subsystem. The CXL memory subsystem unavailability recovery subsystem configures the first CXL device to use a first CXL memory subsystem, and copies data stored in the first CXL memory subsystem by the first CXL device to the non-volatile memory system to generate back-up data. During runtime operations for the computing device, the CXL memory subsystem unavailability recovery system determines the first CXL memory subsystem is unavailable, copies the back-up data from the non-volatile memory system to a second CXL memory subsystem, and configures the first CXL device to use the second CXL memory subsystem and stop using the first CXL memory subsystem without requiring initialization of the computing device subsequent to the determination that the first CXL memory subsystem was unavailable. As such, computing devices and their CXL devices may recover from CXL memory subsystem unavailability without "crashing" and the need to reset, reboot, and/or otherwise initialize the computing device.

The method 300 begins at block 302 where a CXL memory subsystem unavailability recovery subsystem configures one or more CXL device(s) in a computing device to use respective CXL memory subsystem(s) in a CXL memory system. In an embodiment, at block 302, the CXL memory subsystem unavailability recovery engine 204 in the computing device 200 may configure any (or all) of the CXL devices 208-212 to use respective CXL memory subsystems included in a CXL memory system that is included in and/or otherwise accessible by the computing device 200. As will be appreciated by one of skill in the art in possession of the present disclosure, during initialization (e.g., a Power-On Start-Up (POST)) of the computing device 200, the CXL memory subsystem unavailability recovery functionality of the present disclosure may be enabled, activated, and/or otherwise initiated by a Basic Input/Output System (BIOS), Unified Extensible Firmware Interface (UEFI), BMC device, and/or other computing subsystem via, for example, the setting of a register value and/or using other techniques that would be apparent to one of skill in the art in possession of the present disclosure. However, while a specific example of the enablement, activation, and/or other initiation of the CXL memory subsystem unavailability recovery functionality of the present disclosure has been describe as occurring during initialization of the computing device 200, one of skill in the art in possession of the present disclosure will appreciate how the CXL memory subsystem unavailability recovery functionality of the present disclosure may be initiated in other manners and/or at other times, or enabled by default in the computing device 200, while remaining within the scope of the present disclosure as well.

As will be appreciated by one of skill in the art in possession of the present disclosure, the CXL memory subsystem unavailability recovery engine 204 (e.g., the fabric manager described above) may configure the CXL memory system in the computing device 200 during the initialization of the computing device 200, which may include the "pooling" of CXL memory subsystems included in the CXL devices 208-212 to provide the CXL memory system in the computing device 200 using any of a variety of CXL memory system configuration operations known in the art. However, while described as being provided by CXL memory subsystems included in the CXL devices housed in the chassis 202 of the computing device 200, as will be appreciated by one of skill in the art in possession of the present disclosure and as described above, the CXL memory subsystems may be provided external to the chassis 202 of the computing device 200 while remaining within the scope of the present disclosure as well.

Figure 4A:
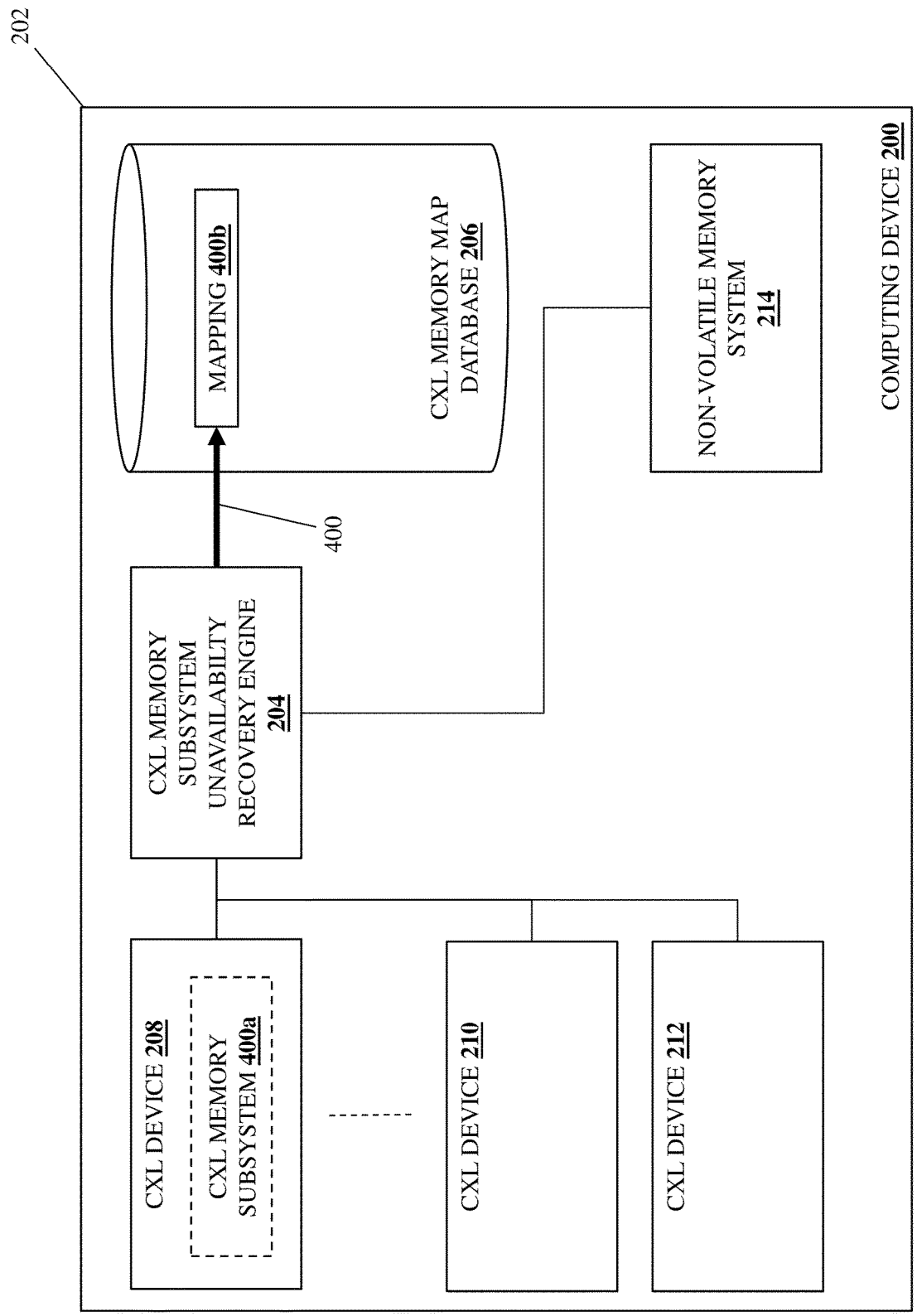
FIG. 4A is a schematic view illustrating an embodiment of the computing device of FIG. 2 operating during the method of FIG. 3.

With reference to FIG. 4A, in an embodiment of block 302, the CXL memory subsystem unavailability recovery engine 204 may perform CXL device/CXL memory subsystem configuration operations 400 that may include identifying the CXL device 208, enumerating the CXL device 208, allocating a CXL memory subsystem 400a from the CXL memory system in the computing device 200 for the CXL device 208, generating a CXL device/CXL memory subsystem mapping 400b in the CXL memory map database 206, identifying the CXL memory subsystem 400a to the CXL device 208 (e.g., identifying to the CXL device 208 a CXL memory subsystem address range in the CXL memory system that provides the CXL memory subsystem 400a), and/or performing any other operations that one of skill in the art in possession of the present disclosure would recognize as configuring the CXL device 208 to utilize the CXL memory subsystem 400a in its operations. In the specific examples provided below, the CXL memory subsystem 400a is described as being included in the CXL device 208, but the embodiments illustrated and discussed below provide the CXL memory subsystem 400a in the Figures with dashed lines to indicate that the CXL memory subsystem 400a may be outside of the CXL device 208 (e.g., in another CXL device, elsewhere in the computing device 200, external to the computing device 200, etc.) while remaining within the scope of the present disclosure.

Figure 4B:
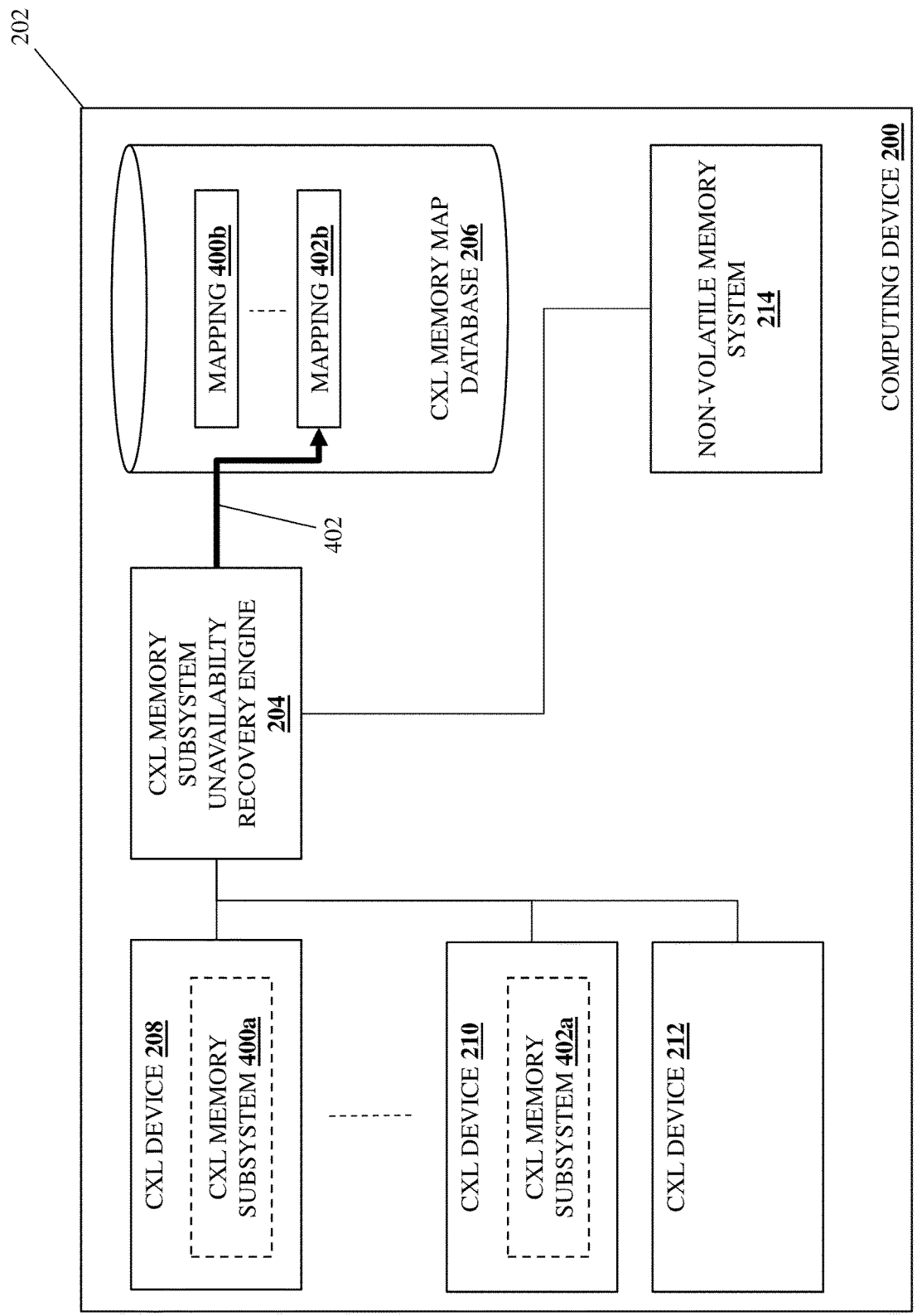
FIG. 4B is a schematic view illustrating an embodiment of the computing device of FIG. 2 operating during the method of FIG. 3.

Similarly, with reference to FIG. 4B and in an embodiment of block 302, the CXL memory subsystem unavailability recovery engine 204 may perform CXL device/CXL memory subsystem configuration operations 402 that may include identifying the CXL device 210, enumerating the CXL device 210, allocating a CXL memory subsystem 402a from the CXL memory system in the computing device 200 for the CXL device 210, generating a CXL device/CXL memory subsystem mapping 402b in the CXL memory map database 206, identifying the CXL memory subsystem 402a to the CXL device 210 (e.g., identifying to the CXL device 210a CXL memory subsystem address range in the CXL memory system that provides the CXL memory subsystem 402a), and/or performing any other operations that one of skill in the art in possession of the present disclosure would recognize as configuring the CXL device 210 to utilize the CXL memory subsystem 402a in its operations. In the specific examples provided below, the CXL memory subsystem 402a is described as being included in the CXL device 210, but the embodiments illustrated and discussed below provide the CXL memory subsystem 402a in the Figures with dashed lines to indicate that the CXL memory subsystem 402a may be outside of the CXL device 210 (e.g., in another CXL device, elsewhere in the computing device 200, external to the computing device 200, etc.) while remaining within the scope of the present disclosure.

Figure 4C:
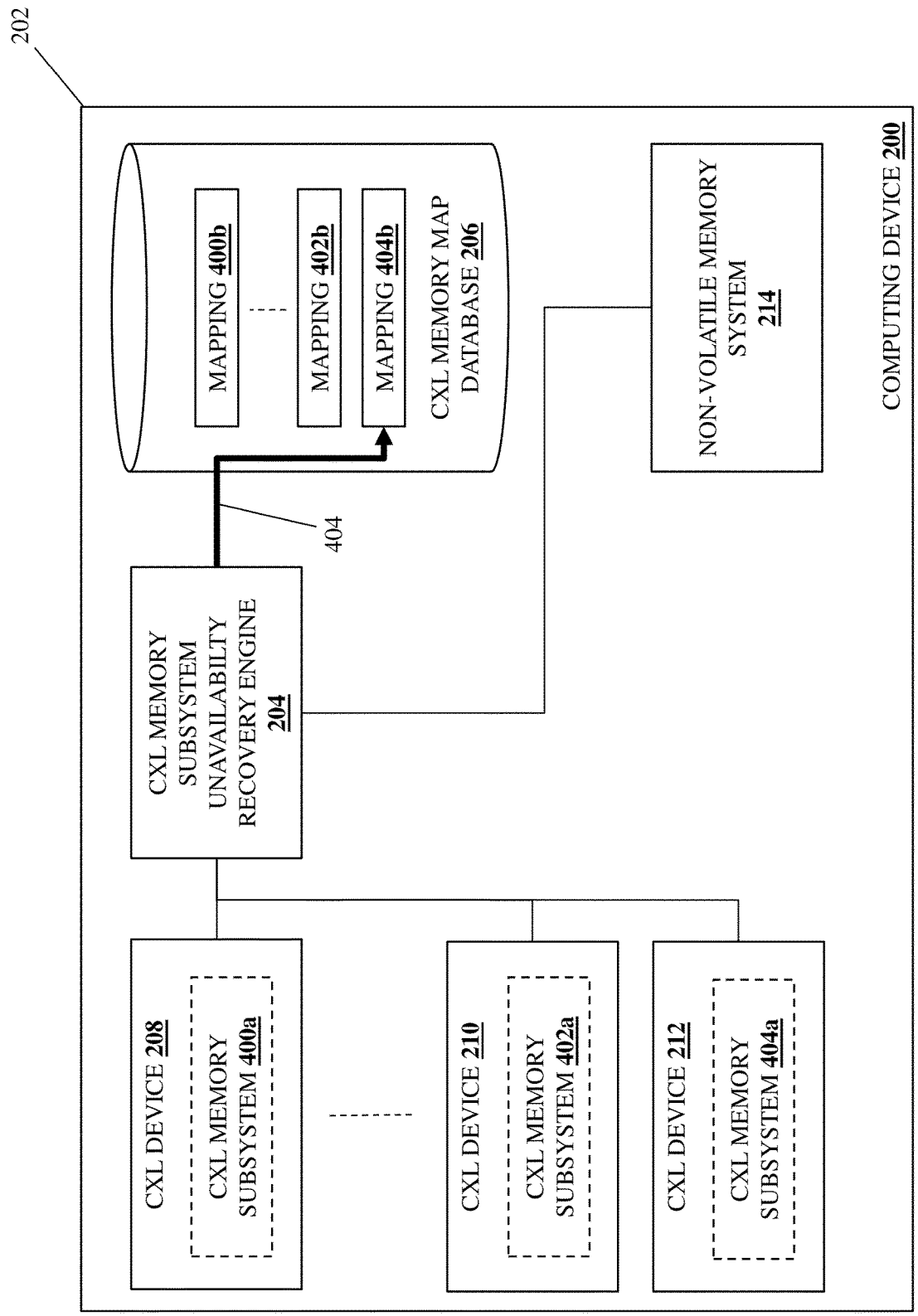
FIG. 4C is a schematic view illustrating an embodiment of the computing device of FIG. 2 operating during the method of FIG. 3.

Similarly as well, with reference to FIG. 4C, in an embodiment of block 302, the CXL memory subsystem unavailability recovery engine 204 may perform CXL device/CXL memory subsystem configuration operations 404 that may include identifying the CXL device 212, enumerating the CXL device 212, allocating a CXL memory subsystem 404a from the CXL memory system in the computing device 200 for the CXL device 212, generating a CXL device/CXL memory subsystem mapping 404b in the CXL memory map database 206, identifying the CXL memory subsystem 404a to the CXL device 212 (e.g., identifying to the CXL device 212a CXL memory subsystem address range in the CXL memory system that provides the CXL memory subsystem 404a), and/or performing any other operations that one of skill in the art in possession of the present disclosure would recognize as configuring the CXL device 212 to utilize the CXL memory subsystem 404a in its operations. In the specific examples provided below, the CXL memory subsystem 404a is described as being included in the CXL device 212, but the embodiments illustrated and discussed below provide the CXL memory subsystem 404a in the Figures with dashed lines to indicate that the CXL memory subsystem 404a may be outside of the CXL device 212 (e.g., in another CXL device, elsewhere in the computing device 200, external to the computing device 200, etc.) while remaining within the scope of the present disclosure.

As such, following block 302, each of the CXL devices 208 and up to 210 and 212 may be configured to utilize the CXL memory subsystem 400a and up to 402a and 402b, respectively, via the CXL device/CXL memory subsystem mapping 400b and up to 402b and 404b, respectively, and in the specific example provided herein each of the CXL devices 208 and up to 210 and 212 may be configured to utilize the CXL memory subsystem 400a and up to 402a and 402b, respectively, that are included in that CXL device. However, while specific examples of the initial mapping of CXL devices to CXL memory subsystems included in those CXL devices has been illustrated and described, one of skill in the art in possession of the present disclosure will appreciate how CXL devices may be configured to utilize other CXL memory subsystems using other configuration techniques while remaining within the scope of the present disclosure as well. Furthermore, while not illustrated or described in detail, one of skill in the art in possession of the present disclosure will appreciate how a host operating system and/or application in the computing device 200 may be configured to utilize the CXL memory system while remaining within the scope of the present disclosure as well.

Figure 5A:
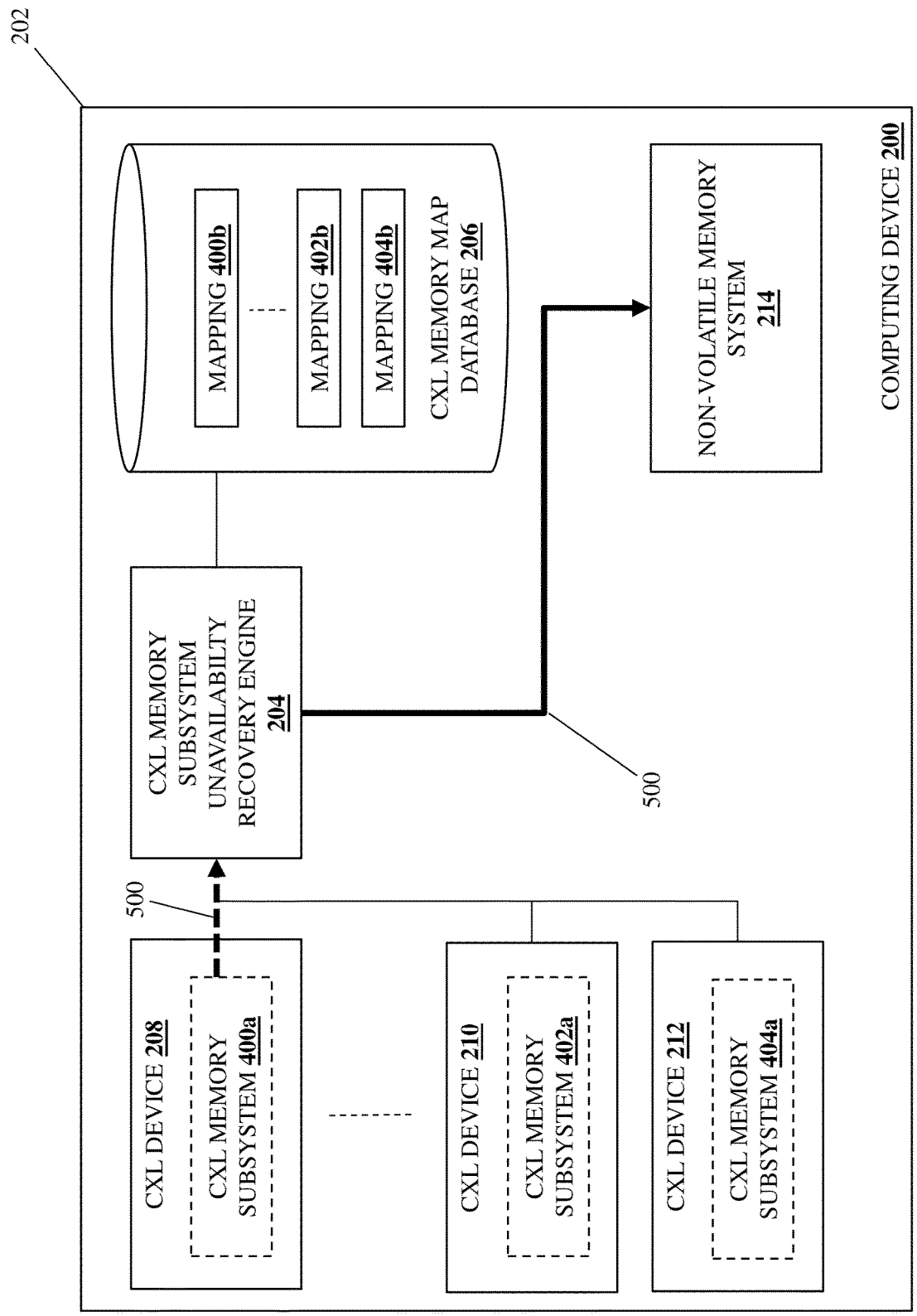
FIG. 5A is a schematic view illustrating an embodiment of the computing device of FIG. 2 operating during the method of FIG. 3.

The method 300 then proceeds to block 304 where the CXL memory subsystem unavailability recovery subsystem copies data stored in the CXL memory subsystem(s) to a non-volatile memory system to generate respective back-up data. As will be appreciated by one of skill in the art in possession of the present disclosure, the configuration of the CXL devices 208-212 to use the CXL memory subsystems 400a-404a, respectively, may result in those CXL devices 208-212 storing data in those CXL memory subsystems 400a-404a, respectively, during their operations. With reference to FIG. 5A, in an embodiment of block 304, the CXL memory subsystem unavailability recovery engine 204 may perform backup data generation operations 500 that may include retrieving any data stored in the CXL memory subsystem 400a by the CXL device 208 (indicated by a dashed line to indicate that the CXL memory subsystem 400a may not actually be included in the CXL device 208 as described above), and storing that data in association with the CXL memory subsystem 400a and/or the CXL device 208 in the non-volatile memory system 214 (e.g., in association with an identifier for the CXL memory subsystem 400a and/or the CXL device 208) in order to generate back-up data for the CXL memory subsystem 400a/CXL device 208. In a specific example, the data backed up from the CXL memory subsystem 400a to the non-volatile memory system 214 may include data critical to any workload(s) being performed by the CXL device 208.

Figure 5B:
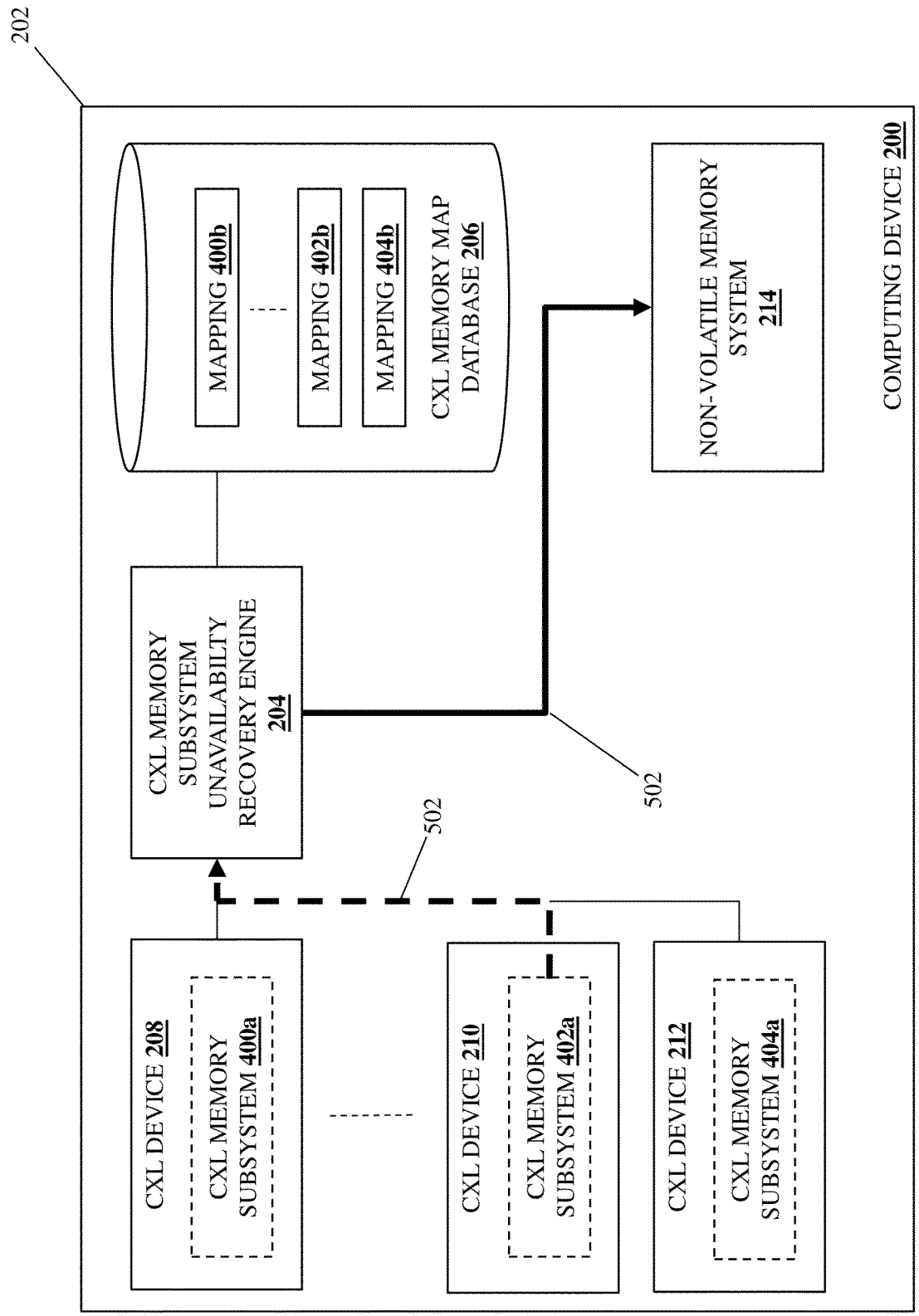
FIG. 5B is a schematic view illustrating an embodiment of the computing device of FIG. 2 operating during the method of FIG. 3.

Similarly, with reference to FIG. 5B and in an embodiment of block 304, the CXL memory subsystem unavailability recovery engine 204 may perform backup data generation operations 502 that may include retrieving any data stored in the CXL memory subsystem 402a by the CXL device 210 (indicated by a dashed line to indicate that the CXL memory subsystem 402a may not actually be included in the CXL device 210 as described above), and storing that data in association with the CXL memory subsystem 402a and/or the CXL device 210 in the non-volatile memory system 214 (e.g., in association with an identifier for the CXL memory subsystem 402a and/or the CXL device 210) in order to generate back-up data for the CXL memory subsystem 402a/CXL device 210. In a specific example, the data backed up from the CXL memory subsystem 402a to the non-volatile memory system 214 may include data critical to any workload(s) being performed by the CXL device 210.

Figure 5C:
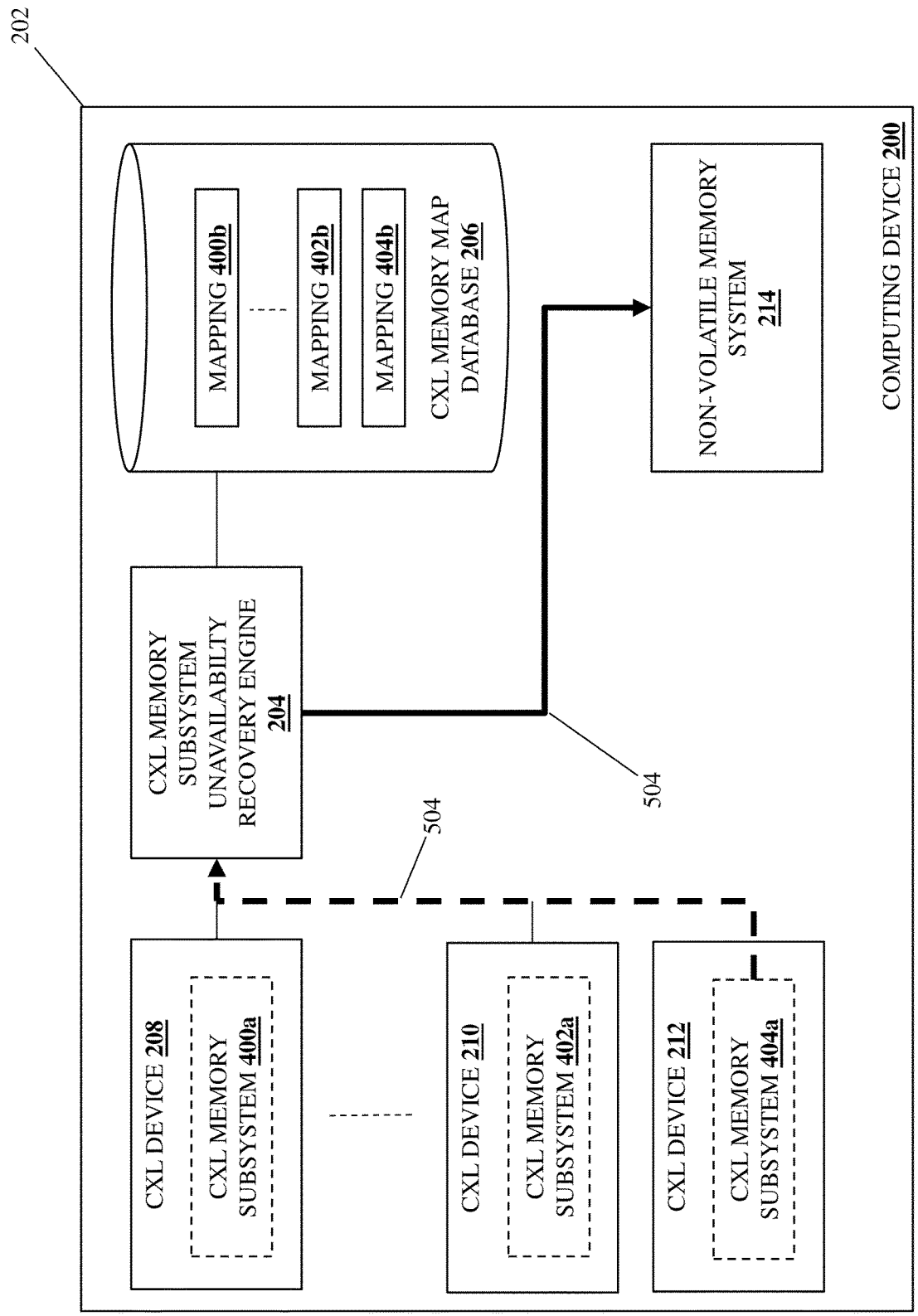
FIG. 5C is a schematic view illustrating an embodiment of the computing device of FIG. 2 operating during the method of FIG. 3.

Similarly as well, with reference to FIG. 5C and in an embodiment of block 304, the CXL memory subsystem unavailability recovery engine 204 may perform backup data generation operations 504 that may include retrieving any data stored in the CXL memory subsystem 404a by the CXL device 212 (indicated by a dashed line to indicate that the CXL memory subsystem 404a may not actually be included in the CXL device 212 as described above), and storing that data in association with the CXL memory subsystem 404a and/or the CXL device 212 in the non-volatile memory system 214 (e.g., in association with an identifier for the CXL memory subsystem 404a and/or the CXL device 212) in order to generate back-up data for the CXL memory subsystem 404a/CXL device 212. In a specific example, the data backed up from the CXL memory subsystem 404a to the non-volatile memory system 214 may include data critical to any workload(s) being performed by the CXL device 212.

As will be appreciated by one of skill in the art in possession of the present disclosure, any of the backup data generation operations 500, 502, and/or 504 may be performed at predetermined times, a threshold time period following the storage of data in a CXL memory subsystem by its CXL device, following the storage of a threshold amount of data in a CXL memory subsystem by its CXL device, and/or in any other frequency or based on any other event that would be apparent to one of skill in the art in possession of the present disclosure. However, while specific examples of the generation of back-up data from the CXL memory subsystems in the non-volatile storage system of the present disclosure has been described, one of skill in the art in possession of the present disclosure will appreciate how back-up data for the CXL memory subsystems of the present disclosure may be generated and persistently stored in a variety of manners that will fall within the scope of the present disclosure as well.

The method 300 then proceeds to decision block 306 where the method 300 proceeds depending on whether a CXL memory subsystem becomes unavailable during runtime of the computing device. As will be appreciated by one of skill in the art in possession of the present disclosure, following the configuration of the CXL devices 208-212 to utilize the CXL memory subsystems 400a-404a, respectively, and the initialization of the computing device 200 such that the computing device 200 begins runtime operations (e.g., an operating system takes control of the computing device 200), any of the CXL memory subsystems 208-212 in the CXL memory system described above may fail or otherwise become unavailable to the CXL device that is configured to use it for any of a variety of reasons known in the art. As such, at decision block 306, the CXL memory subsystem unavailability recovery engine 204 (e.g., the operating system or fabric manager discussed above) may be configured to identify such a CXL memory subsystem unavailability using any of a variety of runtime CXL memory subsystem availability detection techniques that would be apparent to one of skill in the art in possession of the present disclosure.

If, at decision block 306, no CXL memory subsystem has become unavailable during runtime of the computing device, the method 300 returns to block 304. As such, the method 300 may loop such that the CXL memory subsystem unavailability recovery engine 204 copies data stored in the CXL memory subsystems 400a-404a by their CXL devices 208-212, respectively, to the non-volatile memory system 214 to generate respective back-up data until a CXL memory subsystem becomes unavailable during runtime of the computing device 200.

Figure 6:
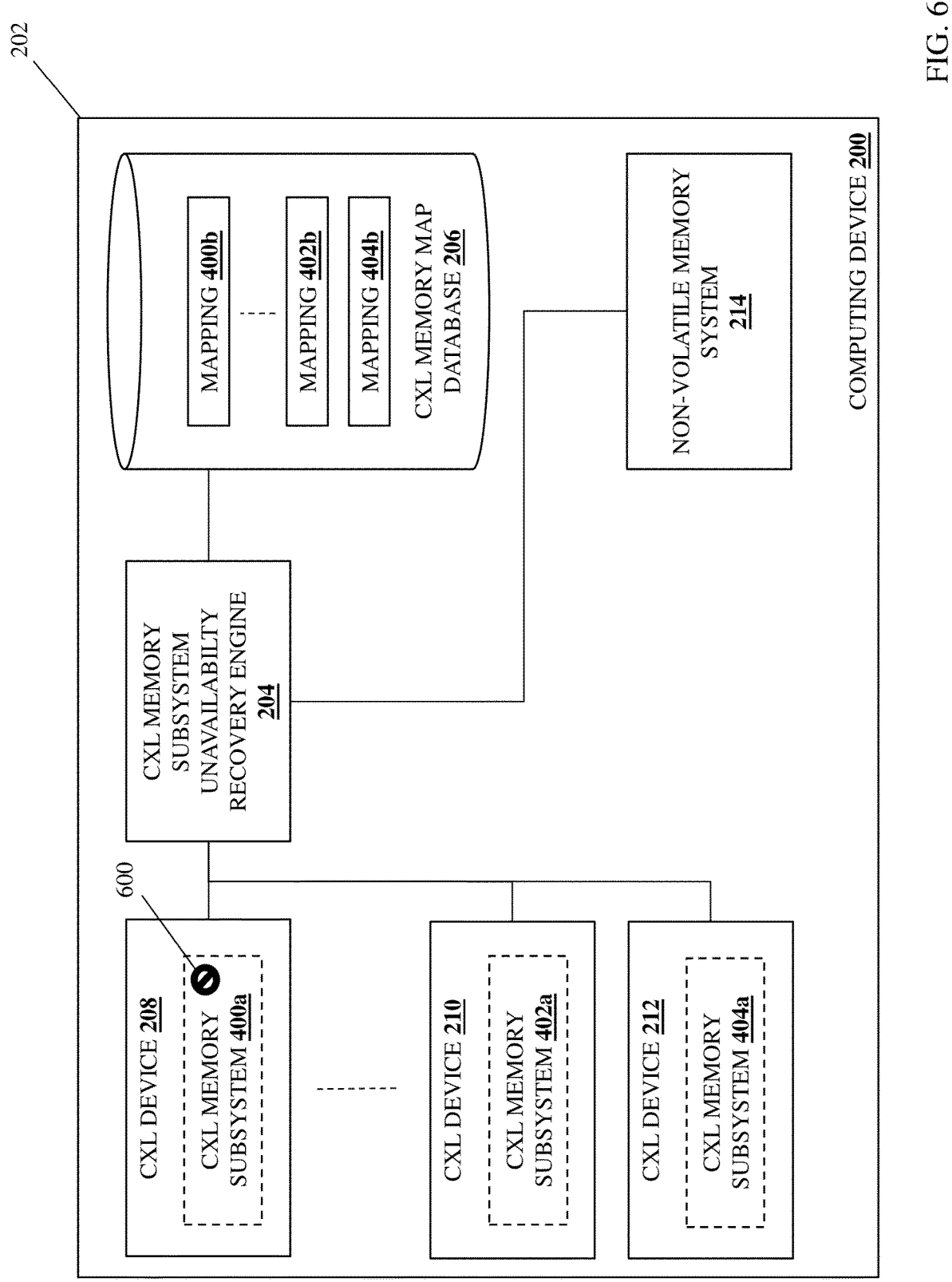
FIG. 6 is a schematic view illustrating an embodiment of the computing device of FIG. 2 operating during the method of FIG. 3.

If, at decision block 306, a CXL memory subsystem has become unavailable during runtime of the computing device, the method 300 proceeds to block 308 where the CXL memory subsystem unavailability recovery subsystem configures the CXL device associated with the unavailable CXL memory subsystem to use an available CXL memory subsystem in the CXL memory system and stop using the unavailable CXL memory subsystem during the runtime of the computing device without requiring initialization of the computing device subsequent to the determination that the unavailable CXL memory subsystem was unavailable. With reference to FIG. 6, in an embodiment of decision block 306, the CXL memory subsystem 400a that was configured for use by the CXL device 208 at block 302 may fail or otherwise become unavailable (as illustrated by element 600 in FIG. 6).

For example, in embodiments in which the CXL memory subsystem 400a is included in the CXL device 208, the CXL memory subsystem 400a may fail or otherwise become unavailable while the CXL device 208 remains operational. In another example, in embodiments in which the CXL memory subsystem 400a is included in another CXL device (i.e., other than the CXL device 208), that CXL device may fail or otherwise become unavailable such that its CXL memory subsystem 400a becomes unavailable. However, while a few specific examples are provided, one of skill in the art in possession of the present disclosure will appreciate how a CXL memory subsystem configured for use by a CXL device may fail or otherwise become unavailable for a variety of reasons that will fall within the scope of the present disclosure as well.

In an embodiment of block 308 and in response a CXL memory subsystem failing or otherwise becoming unavailable to a CXL device that was configured to use that CXL memory subsystem, the CXL memory subsystem unavailability recovery engine 204 may identify memory requirements for that CXL device (e.g., a size of the unavailable CXL memory subsystem that was utilized by the CXL device), identify an available CXL memory subsystem that satisfies those memory requirements, allocate that available CXL memory subsystem to that CXL device, generate a CXL device/available CXL memory subsystem mapping, identify the available CXL memory subsystem to that CXL device (e.g., identify to that CXL device an available CXL memory subsystem address range in the CXL memory system that provides the available CXL memory subsystem), and/or perform any other operations that one of skill in the art in possession of the present disclosure would recognize as configuring that CXL device to utilize that available CXL memory subsystem in its operations.

Figure 7:
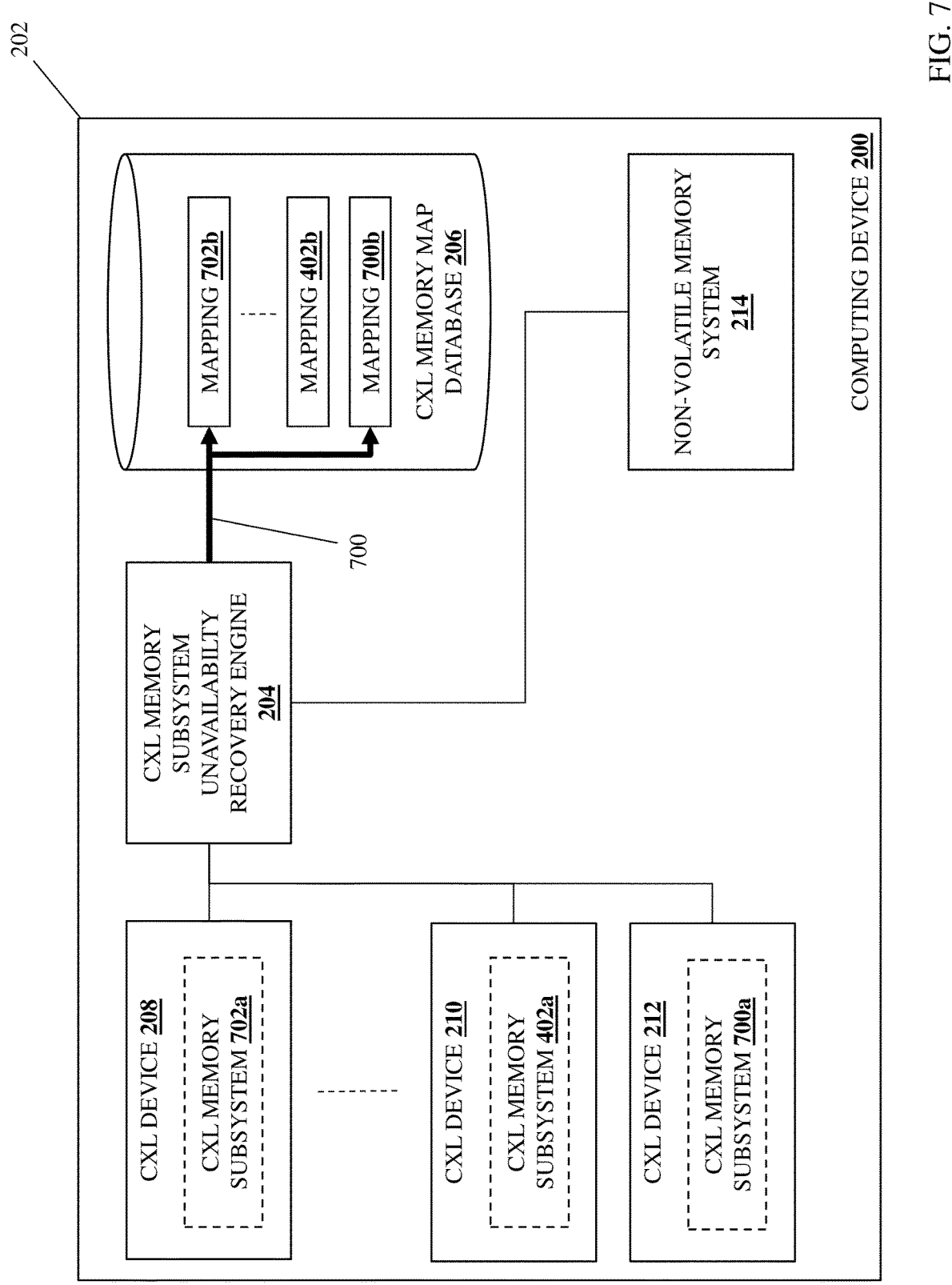
FIG. 7 is a schematic view illustrating an embodiment of the computing device of FIG. 2 operating during the method of FIG. 3.

With reference to FIG. 7, in a specific example of block 308 and in response the CXL memory subsystem 400a failing or otherwise becoming unavailable to the CXL device 208 at decision block 306, the CXL memory subsystem unavailability recovery engine 204 may perform CXL device/CXL memory subsystem reconfiguration operations 700 that, in the illustrated example, include identifying memory requirements for the CXL device 208 (e.g., a size of the CXL memory subsystem 400a configured for use by the CXL device 208), and identifying a portion of the CXL memory subsystem 404a that was configured for use by the CXL device 212 at block 302, that satisfies those memory requirements, and that is not being utilized by the CXL device 212.

The CXL device/CXL memory subsystem reconfiguration operations 700 performed by the CXL memory subsystem unavailability recovery engine 204 may then also include allocating a CXL memory subsystem 700a that provides the portion of the CXL memory subsystem 404a that is being utilized by the CXL device 212 to the CXL device 212, and allocating a CXL memory subsystem 702a that provides the portion of the CXL memory subsystem 404a that is not being utilized by the CXL device 212 to the CXL device 208.

The CXL device/CXL memory subsystem reconfiguration operations 700 performed by the CXL memory subsystem unavailability recovery engine 204 may then also include generating a CXL device/CXL memory subsystem mapping 700b in the CXL memory map database 206, identifying the CXL memory subsystem 700a to the CXL device 212 (e.g., modifying the CXL memory subsystem address range that provides the CXL memory subsystem 404a to a CXL memory subsystem address range that provides the CXL memory subsystem 700a, and identifying to the CXL device 212 that modified CXL memory subsystem address range that provides the CXL memory subsystem 700a), and/or performing any other operations that one of skill in the art in possession of the present disclosure would recognize as configuring the CXL device 212 to utilize the CXL memory subsystem 700a in its operations.

The CXL device/CXL memory subsystem reconfiguration operations 700 performed by the CXL memory subsystem unavailability recovery engine 204 may then also include generating a CXL device/CXL memory subsystem mapping 702b in the CXL memory map database 206, identifying the CXL memory subsystem 702a to the CXL device 208 (e.g., modifying the CXL memory subsystem address range that provides the CXL memory subsystem 400a to a CXL memory subsystem address range that provides the CXL memory subsystem 702a, and identifying to the CXL device 208 that modified CXL memory subsystem address range that provides the CXL memory subsystem 702a), and/or performing any other operations that one of skill in the art in possession of the present disclosure would recognize as configuring the CXL device 208 to utilize the CXL memory subsystem 702a in its operations.

However, while a specific example of "taking" an available CXL memory subsystem from another CXL device for use by a CXL device whose CXL memory subsystem became unavailable has been described, one of skill in the art in possession of the present disclosure will appreciate how a CXL device whose CXL memory subsystem becomes unavailable may be configured to utilize an available CXL memory subsystem (e.g., CXL memory subsystems not currently utilized by any CXL devices) in a variety of manners that will fall within the scope of the present disclosure as well.

Figure 8:
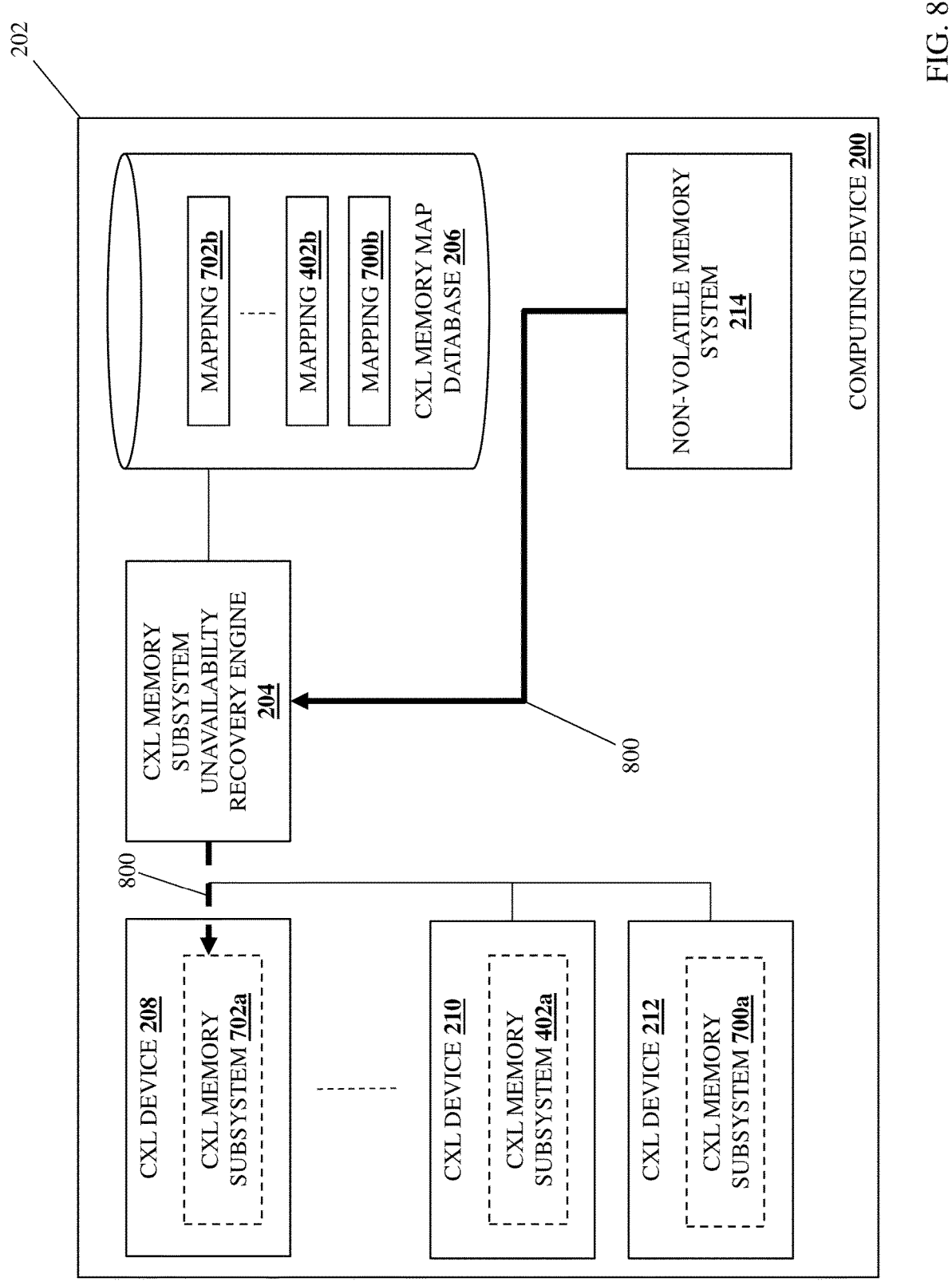
FIG. 8 is a schematic view illustrating an embodiment of the computing device of FIG. 2 operating during the method of FIG. 3.

The method 300 then proceeds to block 310 where the CXL memory subsystem unavailability recovery subsystem copies the back-up data for the unavailable CXL memory subsystem to the available CXL memory subsystem during the runtime of the computing device. With reference to FIG. 8, in an embodiment of block 310, the CXL memory subsystem unavailability recovery engine 204 may perform back-up data copying operations 800 that may include retrieving, from the non-volatile storage system 214, the back-up data that was copied from the CXL memory subsystem 400a to the non-volatile storage system 214 at block 304, and copying that back-up data to the CXL memory subsystem 702a (indicated by a dashed line to indicate that the CXL memory subsystem 702a may not actually be included in the CXL device 208 as described above).

As will be appreciated by one of skill in the art in possession of the present disclosure, in the specific example above in which the CXL memory subsystem 700a that provides the portion of the CXL memory subsystem 404a that is being utilized by the CXL device 212 is allocated to the CXL device 212, the allocation of the CXL memory subsystem 700a to the CXL device 212 may include allocating the portion of the CXL memory subsystem 404a that stores the data being utilized by the CXL device 212. As such, in some embodiments there may be no need to copy any back-up data to the CXL memory subsystem 700a (e.g., the back-up data that was copied from the CXL memory subsystem 404a to the non-volatile storage system 214 at block 304). However, one of skill in the art in possession of the present disclosure will appreciate how other embodiments may require the copying of back-up data to the CXL memory subsystem 700a (e.g., the back-up data that was copied from the CXL memory subsystem 404a to the non-volatile storage system 214 at block 304) while remaining within the scope of the present disclosure as well.

While the method 300 is described above as providing for the configuration of the CXL device 208 to use the available CXL memory subsystem 702a prior to copying the back-up data for the CXL memory subsystem 400a from the non-volatile memory system 214 to the available CXL memory subsystem 702a, one of skill in the art in possession of the present disclosure will appreciate how the back-up data for the CXL memory subsystem 400a may be copied from the non-volatile memory system 214 to the available CXL memory subsystem 702a prior to configuring of the CXL device 208 to use the available CXL memory subsystem 702a while remaining within the scope of the present disclosure as well.

As will be appreciated by one of skill in the art in possession of the present disclosure, the operations that are described as being performed at blocks 308 and 310 subsequent to the unavailability of the CXL memory subsystem 400a occur during the same runtime of the computing device 200 in which the unavailability of the CXL memory subsystem 400a occurs and is detected. Thus, the CXL memory subsystem unavailability and the recovery from that CXL memory subsystem unavailability (e.g., via the configuration of CXL device 208 to use the available CXL memory subsystem 702a and the copying of the back-up data for the unavailable CXL memory subsystem 400a to the available memory subsystem 702a) all occur during that runtime of the computing device 200 and without requiring initialization of the computing device 200 subsequent to the determination that the CXL memory subsystem 400a was unavailable.

As such, following block 310, each of the CXL devices 208 and up to 210 and 212 may be configured to utilize the CXL memory subsystem 702a and up to 402a and 700a, respectively, via the CXL device/CXL memory subsystem mapping 702b and up to 402b and 700b, respectively, and in the specific example provided herein each of the CXL devices 208 and 212 may be configured to utilize the CXL memory subsystems 702a and 700a, respectively, included in the CXL device 212. Thus, the CXL memory subsystem 400a for the CXL device 208 may become unavailable, the CXL device 208 may be configured to utilize the available CXL memory subsystem 702a, the backup data for the CXL memory subsystem 400a may be copied to the CXL memory subsystem 702a, and the CXL device 208 may begin using that CXL memory subsystem 702a, all in the same runtime of the computing device 200 and without requiring initialization of the computing device 200 subsequent to the determination that the CXL memory subsystem 400a was unavailable. The method 300 may then return to block 304 such that any data stored by the CXL devices 208 and up to 210 and 212 in the CXL memory subsystem 702a and up to 402*a* and 700*a*, respectively, is backed up in the non-volatile memory system 214 similarly as described above, with any subsequent CXL memory subsystem unavailability addressed similarly as described above in blocks 306-310.

Thus, systems and methods have been described that provide for the backing up of data stored in CXL memory subsystem(s) by respective CXL device(s) to a non-volatile memory system, and when any of those CXL memory subsystem(s) become unavailable, the copying of the back-up data for that unavailable CXL memory subsystem from the non-volatile storage system to an available CXL memory subsystem, and the configuration of the respective CXL device associated with the unavailable CXL memory subsystem to use the available CXL memory subsystem in place of that unavailable CXL memory subsystem. For example, the CXL memory subsystem unavailability recovery system may include a computing device having a CXL device, CXL memory subsystems, a non-volatile memory system, and a CXL memory subsystem unavailability recovery subsystem. The CXL memory subsystem unavailability recovery subsystem configures the first CXL device to use a first CXL memory subsystem, and copies data stored in the first CXL memory subsystem by the first CXL device to the non-volatile memory system to generate back-up data. During runtime operations for the computing device, the CXL memory subsystem unavailability recovery system determines the first CXL memory subsystem is unavailable, copies the back-up data from the non-volatile memory system to a second CXL memory subsystem, and configures the first CXL device to use the second CXL memory subsystem and stop using the first CXL memory subsystem without requiring initialization of the computing device subsequent to the determination that the first CXL memory subsystem was unavailable. As such, hardware-agnostic data backups may be provided for CXL devices in a computing device in order to allow for the recovery from CXL memory subsystem unavailability without "crashing" and the need to reset, reboot, and/or otherwise initialize the computing device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Compute Express Link (CXL) memory subsystem unavailability recovery system, comprising:
   a computing device;
   a first Compute Express Link (CXL) device that is included in the computing device;
   a CXL memory system that is included in the computing device and that includes a plurality of CXL memory subsystems;
   a non-volatile memory system that is included in the computing device; and
   a CXL memory subsystem unavailability recovery subsystem that is included in the computing device and that is coupled to the CXL device, the CXL memory system, and the non-volatile memory system, wherein the CXL memory subsystem unavailability recovery subsystem is configured to:
      configure the first CXL device to use a first CXL memory subsystem included in the CXL memory system;
      copy data stored in the first CXL memory subsystem by the first CXL device to the non-volatile memory system to generate back-up data;
      determine, during runtime operations for the computing device, that the first CXL memory subsystem is unavailable;
      copy, during the runtime operations for the computing device, the back-up data from the non-volatile memory system to a second CXL memory subsystem included in the CXL memory system;
      configure, during the runtime operations for the computing device, the first CXL device to use the second CXL memory subsystem and stop using the first CXL memory subsystem without requiring initialization of the computing device subsequent to the determination that the first CXL memory subsystem was unavailable.

2. The system of claim 1, wherein the CXL memory subsystem unavailability recovery subsystem is configured to:
   generate a first CXL device/first CXL memory subsystem mapping and store the first CXL device/first CXL memory subsystem mapping in a CXL memory map database in order to configure the first CXL device to use the first CXL memory subsystem; and
   generate a first CXL device/second CXL memory subsystem mapping and store the first CXL device/second CXL memory subsystem mapping in the CXL memory map database in order to configure the first CXL device to use the second CXL memory subsystem without requiring initialization of the computing device subsequent to the determination that the first CXL memory subsystem was unavailable.

3. The system of claim 1, wherein the non-volatile memory system is included in a Solid State Drive (SSD) storage device that is included in the computing device.

4. The system of claim 1, wherein the CXL memory subsystem unavailability recovery subsystem is provided, at least in part, by one of:
   a processing system that is included in the computing device;
   a Baseboard Management Controller (BMC) device that is included in the computing device; or
   a CXL switch device.

5. The system of claim 1, wherein the configuring the first CXL device to use the second CXL memory subsystem and stop using the first CXL memory subsystem includes:
   modifying a first CXL memory subsystem address range that is provided by the first CXL memory subsystem to a second CXL memory subsystem address range that is provided by the second CXL memory subsystem.

6. The system of claim 1, wherein the CXL memory subsystem unavailability recovery subsystem is configured to provide an operating system and a fabric manager, and wherein:
   one of the operating system or the fabric manager is configured to determine that the first CXL memory subsystem is unavailable;
   the fabric manager is configured to copy the back-up data from the non-volatile memory system to the second CXL memory subsystem; and
   the operating system is configured to configure the first CXL device to use the second CXL memory subsystem and stop using the first CXL memory subsystem.

7. The system of claim 1, further comprising:
   a second CXL device that is included in the computing device, wherein the first CXL memory subsystem is included in the first CXL device, and wherein the second CXL memory subsystem is included in the second CXL device.

8. An Information Handling System (IHS), comprising:
a processing system; and
a memory system that is coupled to the processing system and that includes instructions that, when executed by the processing system, cause the processing system to provide a Compute Express Link (CXL) memory subsystem unavailability recovery engine that is configured to:
configure a first CXL device that is coupled to the processing system to use a first CXL memory subsystem that is included in a CXL memory system that is coupled to the processing system;
copy data stored in the first CXL memory subsystem by the first CXL device to a non-volatile memory system that is coupled to the processing system to generate back-up data;
determine, during runtime operations for the IHS, that the first CXL memory subsystem is unavailable;
copy, during the runtime operations for the IHS, the back-up data from the non-volatile memory system to a second CXL memory subsystem that is included in the CXL memory system;
configure, during the runtime operations for the IHS, the first CXL device to use the second CXL memory subsystem and stop using the first CXL memory subsystem without requiring initialization of the IHS subsequent to the determination that the first CXL memory subsystem was unavailable.

9. The IHS of claim 8, wherein the CXL memory subsystem unavailability recovery engine is configured to:
generate a first CXL device/first CXL memory subsystem mapping and store the first CXL device/first CXL memory subsystem mapping in a CXL memory map database in order to configure the first CXL device to use the first CXL memory subsystem; and
generate a first CXL device/second CXL memory subsystem mapping and store the first CXL device/second CXL memory subsystem mapping in the CXL memory map database in order to configure the first CXL device to use the second CXL memory subsystem without requiring initialization of the IHS subsequent to the determination that the first CXL memory subsystem was unavailable.

10. The IHS of claim 8, wherein the non-volatile memory system is included in a Solid State Drive (SSD) storage device that is coupled to the processing system.

11. The IHS of claim 8, wherein the CXL memory subsystem unavailability recovery engine is provided, at least in part, by one of:
a root complex included in the processing system;
a Baseboard Management Controller (BMC) device; or
a CXL switch device.

12. The IHS of claim 8, wherein the configuring the first CXL device to use the second CXL memory subsystem and stop using the first CXL memory subsystem includes:
modifying a first CXL memory subsystem address range that is provided by the first CXL memory subsystem to a second CXL memory subsystem address range that is provided by the second CXL memory subsystem.

13. The IHS of claim 8, wherein the CXL memory subsystem unavailability recovery engine is configured to provide an operating system and a fabric manager, and wherein:

one of the operating system or the fabric manager is configured to determine that the first CXL memory subsystem is unavailable;
the fabric manager is configured to copy the back-up data from the non-volatile memory system to the second CXL memory subsystem; and
the operating system is configured to configure the first CXL device to use the second CXL memory subsystem and stop using the first CXL memory subsystem.

14. A method for recovering from unavailability of a Compute Express Link (CXL) memory subsystem, comprising:
configuring, by a Compute Express Link (CXL) memory subsystem unavailability recovery subsystem, a first CXL device that is included in a computing device to use a first CXL memory subsystem that is included in a CXL memory system;
copying, by the CXL memory subsystem unavailability recovery subsystem, data stored in the first CXL memory subsystem by the first CXL device to a non-volatile memory system to generate back-up data;
determining, by the CXL memory subsystem unavailability recovery subsystem during runtime operations for the computing device, that the first CXL memory subsystem is unavailable;
copying, by the CXL memory subsystem unavailability recovery subsystem during the runtime operations for the computing device, the back-up data from the non-volatile memory system to a second CXL memory subsystem that is included in the CXL memory system;
configuring, by the CXL memory subsystem unavailability recovery subsystem during the runtime operations for the computing device, the first CXL device to use the second CXL memory subsystem and stop using the first CXL memory subsystem without requiring initialization of the computing device subsequent to the determination that the first CXL memory subsystem was unavailable.

15. The method of claim 14, further comprising: generating, by the CXL memory subsystem unavailability recovery subsystem, a first CXL device/first CXL memory subsystem mapping and storing the first CXL device/first CXL memory subsystem mapping in a CXL memory map database in order to configure the first CXL device to use the first CXL memory subsystem; and generating, by the CXL memory subsystem unavailability recovery subsystem, a first CXL device/second CXL memory subsystem mapping and storing the first CXL device/second CXL memory subsystem mapping in the CXL memory map database in order to configure the first CXL device to use the second CXL memory subsystem without requiring initialization of the computing device subsequent to the determination that the first CXL memory subsystem was unavailable.

16. The method of claim 14, wherein the non-volatile memory system is included in a Solid State Drive (SSD) storage device.

17. The method of claim 14, wherein the CXL memory subsystem unavailability recovery subsystem is provided, at least in part, by one of:
a processing system that is included in the computing device;
a Baseboard Management Controller (BMC) device; or
a CXL switch device.

18. The method of claim 14, wherein the configuring the first CXL device to use the second CXL memory subsystem and stop using the first CXL memory subsystem includes:

modifying a first CXL memory subsystem address range that is provided by the first CXL memory subsystem to a second CXL memory subsystem address range that is provided by the second CXL memory subsystem.

19. The method of claim 14, further comprising:
determining, by one of an operating system or a fabric manager provided by the CXL memory subsystem unavailability recovery subsystem, that the first CXL memory subsystem is unavailable;
copying, by the fabric manager provided by the CXL memory subsystem unavailability recovery subsystem, the back-up data from the non-volatile memory system to the second CXL memory subsystem; and
configuring, by the operating system provided by the CXL memory subsystem unavailability recovery subsystem, the first CXL device to use the second CXL memory subsystem and stop using the first CXL memory subsystem.

20. The method of claim 14, wherein the first CXL memory subsystem is included in the first CXL device, and wherein the second CXL memory subsystem is included in a second CXL device that is included in the computing device.

* * * * *